United States Patent [19]

Krueger et al.

[11] Patent Number: 5,707,220
[45] Date of Patent: Jan. 13, 1998

[54] CENTRIFUGAL OIL PUMP FOR A VARIABLE SPEED HERMETIC COMPRESSOR

[75] Inventors: Manfred Krueger; Dietmar Erich Bernhard Lilie, both of Joinville-SC, Brazil

[73] Assignee: Empresa Brasileira de Compressores S/A.-Embraco, Joinville-SC,, Brazil

[21] Appl. No.: 564,046

[22] PCT Filed: Apr. 4, 1994

[86] PCT No.: PCT/BR94/00010

§ 371 Date: Apr. 18, 1996

§ 102(e) Date: Apr. 18, 1996

[87] PCT Pub. No.: WO95/27139

PCT Pub. Date: Oct. 12, 1995

[51] Int. Cl.$^6$ .............................. F04B 35/04; F01C 21/04
[52] U.S. Cl. .............................. 417/423.12; 417/424.1; 418/94
[58] Field of Search ............. 417/423.12, 424.1, 417/410.3, 410.5, 902, 423.13; 418/88, 94; 184/6.18

[56] References Cited

U.S. PATENT DOCUMENTS

| | | | |
|---|---|---|---|
| 3,184,157 | 5/1965 | Galin | 417/410.3 |
| 4,792,296 | 12/1988 | Kobayashi et al. | 418/88 |
| 5,007,808 | 4/1991 | Fraser et al. | 184/6.18 |
| 5,176,506 | 1/1993 | Siebel | 417/368 |
| 5,377,781 | 1/1995 | Yun | 417/902 |

FOREIGN PATENT DOCUMENTS

WO 93 22557  11/1993  WIPO.

Primary Examiner—Charles G. Freay
Attorney, Agent, or Firm—Darby & Darby

[57] ABSTRACT

Centrifugal oil pump for variable speed hermetic compressors, comprising: a hermetic shell (1), which lodges therewithin, a cylinder block (3), supporting a vertical eccentric shaft (5), whereto is mounted the rotor (8) of an electric motor (6), the eccentric shaft (5) being provided with at least one oil channel (9), having a lower end (9b), opened to a lower end (5b) of the eccentric shaft (5), wherein the eccentric shaft-rotor assembly attaches, at its lower part, an upper extension (12) of a pump rotor (10) and a tubular sleeve (20), attached to an inertial portion of the compressor and surrounding at least the portion of said pump rotor (10) external to the rotor (8), said pump rotor (10) presenting a centrifugation region (15), radially extending beyond the edges of the lower end (5b) of the eccentric shaft (5) and having a lower end nozzle (10b) that is permanently immersed in the oil sump (2), which is internally defined at the bottom of the shell (1) and with at least an upper radial nozzle (11b), communicating with at least an oil conducting axial channel (18), which communicated with the lower end of the oil channel (9) through at least one dragging duct (14), which is longitudinally provided through the upper extension (12) of the pump rotor (10).

9 Claims, 2 Drawing Sheets

CENTRIFUGAL OIL PUMP FOR A VARIABLE SPEED HERMETIC COMPRESSOR

FIELD OF THE INVENTION

The present invention refers to an oil pump for variable speed hermetic compressors of the reciprocating type, particularly those having a vertical shaft and used in refrigerators and freezers.

BACKGROUND OF THE INVENTION

These appliances require that their respective hermetic compressors supply the exact refrigerating capacity necessary to remove the internal heat from the medium to be refrigerated. As the refrigerating capacity is proportional to the flow of the refrigerant mass pumped by the compressor, a variation of the refrigerating capacity is related to a variation of the mass flow pumped by the compressor. A technique of continuously obtaining said variation in the refrigerant mass flow is by varying the motor speed.

There are studies indicating that the variable speed compressors need an operative range from 15Hz to 100Hz, i.e., speeds between 900 and 6000 rpm, in order to achieve a good refrigerating performance. Such speed variation affects the mechanical operation of the compressor, especially the operation of the oil pump, which conducts the oil to the bearings of the compressor mechanism and other regions in need of lubrication, such as the connecting rod and piston.

Centrifugal pumps are the oil pumping mechanisms most used in hermetic compressors, both for their relatively low cost and adequate operation in 3000 rpm up to 3600 rpm rotation range, which result from the frequency of the electrical network. Nevertheless, such mechanisms become inoperative at low rotation speeds.

Conventional oil pumps of the centrifugal type, such as the one illustrated in FIG. 1 and presently in use, are not capable of pumping the oil to the bearings when the compressor needs to operate at low speeds.

The operative limitations of the centrifugal pump are related to the difference between its larger radius (R) and its smaller radius (r), as shown in the equation below, which governs the behavior of the centrifugal pump:

$$\omega = [(2 \times g \times h)/(R^2 - r^2)]^{1/2}$$

where h is the required pumping height from the oil level up to the bearings; g is the gravitational constant; R is the larger radius of the pump; r is the smaller radius; and $\omega$ is the angular speed (rd/sec). The search for an increase in the oil pumping efficiency in such compressors by simply increasing the larger radius (R) of the pump is unfeasible, because such increase, which is necessarily substantial to achieve the desired pumping, also affects the external diameter of the compressor shaft and, consequently, all of the manufacturing processes of the compressor and the performance thereof, since it causes greater losses due to friction. It should be observed that small diameter alterations are not enough to achieve the necessary degree of centrifugal pumping at rotational speeds close to or lower than 900 rpm.

Conventional centrifugal pumps which have a vertical or a horizontal shaft are widely used in hermetic compressors, as evidenced by the patent documents U.S. Pat. No. 4,478, 559; U.S. Pat. No. 4,569,639; DT 209,877 and FR 2,492, 471. Nevertheless, said centrifugal pumps do not work, or work inefficiently, at rotational speeds lower than about 900 rpm.

In another solution, described in a copending patent application of the same applicant, the increase in the pumping efficiency is achieved through a pump rotor having ascending helical grooves which are provided along a portion of the outer surface of the longitudinal extension of said rotor. This solution, though presenting an efficient lubrication at rotational speeds (600 rpm) lower than those reached with conventional oil pumps, achieves its pumping effect by mechanically moving the oil along the helical grooves of the pump rotor.

OBJECT OF THE INVENTION

Thus, it is an object of the present invention to provide a centrifugal type oil pump for variable speed reciprocating hermetic compressors having a vertical shaft, in which the pumping performance is similar to that obtained with pumps using mechanical movement of the oil at low rotational speeds, e.g., about 600 rpm.

A second object of the present invention is to provide an oil pump as mentioned above, whose pumping capacity is increased, without constructive alterations or redimensionings of the cylinder block components.

A third object of the present invention is to provide an oil pump of simple manufacture and assembly.

A fourth object of the present invention is to provide an oil pump that does not generate oil whirl in the sump of the compressor, as occurs with some conventional centrifugal oil pumps.

BRIEF DESCRIPTION OF THE INVENTION

These and other objectives and advantages are attained from an oil pump for a variable speed hermetic compressor of the type including the oil pump of the present invention. Such oil pump includes a hermetic shell, which defines a lubricant oil sump at its bottom and which lodges therewithin; and a cylinder Block which supports a vertical eccentric shaft to which is mounted a rotor of an electric motor. The eccentric shaft is provided with at least one oil channel having a lower end opened to the lower end of the eccentric shaft and an upper end opened to the external part of the upper median portion of the eccentric shaft. The eccentric shaft-rotor assembly has attached at its lower part an upper extension of a pump rotor and a tubular sleeve attached to an inertial portion of the compressor and surrounding at least the portion of said pump rotor external to the rotor. The pump rotor has at a portion of its extension external to the rotor a centrifugation region radially extending beyond the lower end edges of the eccentric shaft and having a lower end nozzle that is permanently immersed in the oil sump and in permanent fluid communication with at least an upper radial nozzle that communicates with at least one oil conducting axial channel defined between the peripheral surface of said portion of the pump rotor external to the rotor and a respective angular sector of the adjacent internal wall portion of the tubular sleeve. The oil conducting axial channel communicates with the lower end of the oil channel through at least one oil dragging duct, which is longitudinally provided through the upper extension of the pump rotor.

The oil pump as described above has the advantage of not depending upon the physical dimensions of the compressor, wherein the minimum rotation speed (e.g., 600 rpm) is easily obtained by adjusting the diameter of the pump rotor. The oil pump may also be used at rotation speeds above 6000 rpm without impairing its operation and allowing its application in compressors mounted in the conventional manner, i.e., with the motor at the lower part of the body.

DETAILED DESCRIPTION OF THE INVENTION

The invention will be described below, with reference to the attached drawings, in which.

BEST MODE OF CARRYING OUT THE INVENTION

Figure 1:
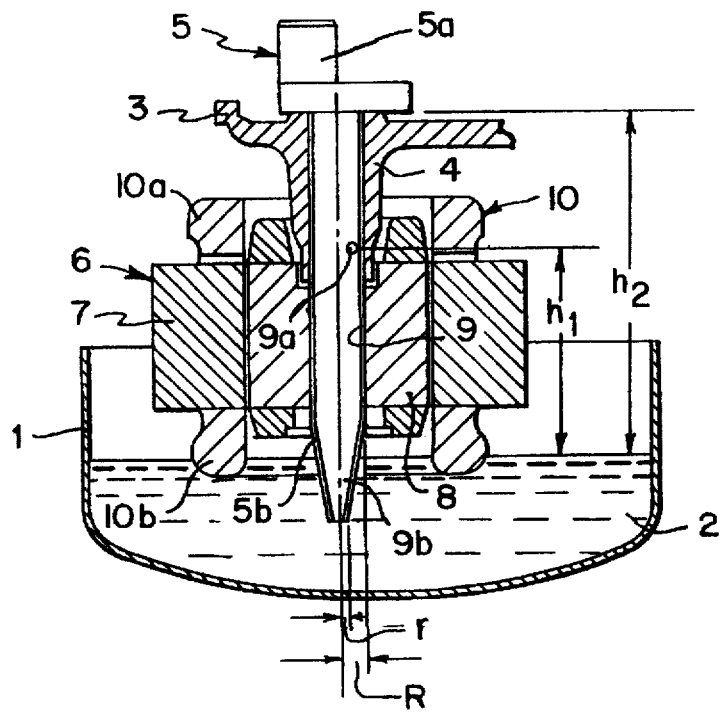
FIG. 1 illustrates a prior art oil pump, in a longitudinal diametral section view, mounted inside a hermetic compressor and showing the dimensions $h_1$, $h_2$, R and r.

According to the drawing figures described above, a variable speed hermetic compressor of the vertical shaft type includes a hermetic shell 1, defining a lubricant oil sump 2 at its bottom. A cylinder block 3 within the shell incorporating a bearing 4 for supporting a vertical eccentric shaft 5 having an upper end 5a and a lower end 5b. An electric motor 6 having a stator 7 is attached to the cylinder block 3 and a rotor 8 is attached to a portion of the eccentric shaft 5 located below the bearing 4 and defining an eccentric shaft-rotor assembly. The eccentric shaft 5 is provided with at least one oil channel 9, having a lower end 9b opened to the lower end 5b of the eccentric shaft 5 and an upper end 9a opened to the external part of the upper median portion of the eccentric shaft 5 at the region of the bearing 4. The eccentric shaft 5 has fitted at its lower end 5b an upper end 10a of a centrifugal pump rotor 10, whose lower end nozzle 10b is immersed in the oil mass provided in the sump 2.

Figure 2A:
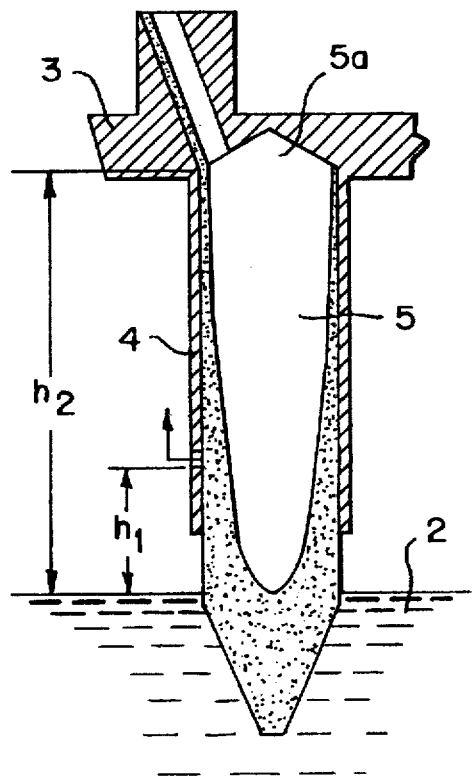
FIGS. 2a and 2b illustrate, respectively, an enlarged view of a prior art oil pump, during the oil pumping at a normal angular speed (2a) and at a reduced speed (2b)
Figure 2B:
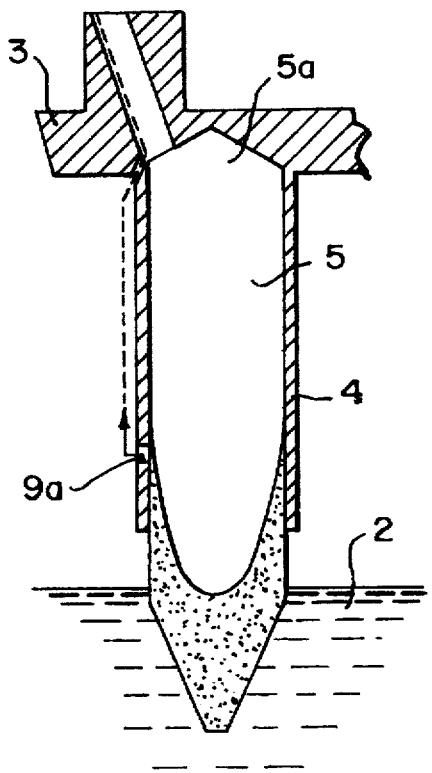

In these compressors, as illustrated in FIGS. 2a and 2b, the lubrication of the bearings and other components is made through centrifugation during the rotation of the eccentric shaft-rotor assembly, the rotation speed being about 3000–3600 rpm during the normal operation of the compressor.

Nevertheless, at low rotation speeds, usually lower than 2000 rpm, the lubrication of the components becomes marginal, or occasionally does not exist at all, since the oil column formed by the centrifugal effect inside the oil channel 9 no longer reaches the upper end 9a of the oil channel 9.

In such compressors, the efficiency of the oil pump is a function of the relation between its smaller diameter (radius r), immersed in the sump 2, and its larger diameter (radius R). The closer said values, the less will be the lubrication force of said oil pump, as mentioned above.

Figure 3:
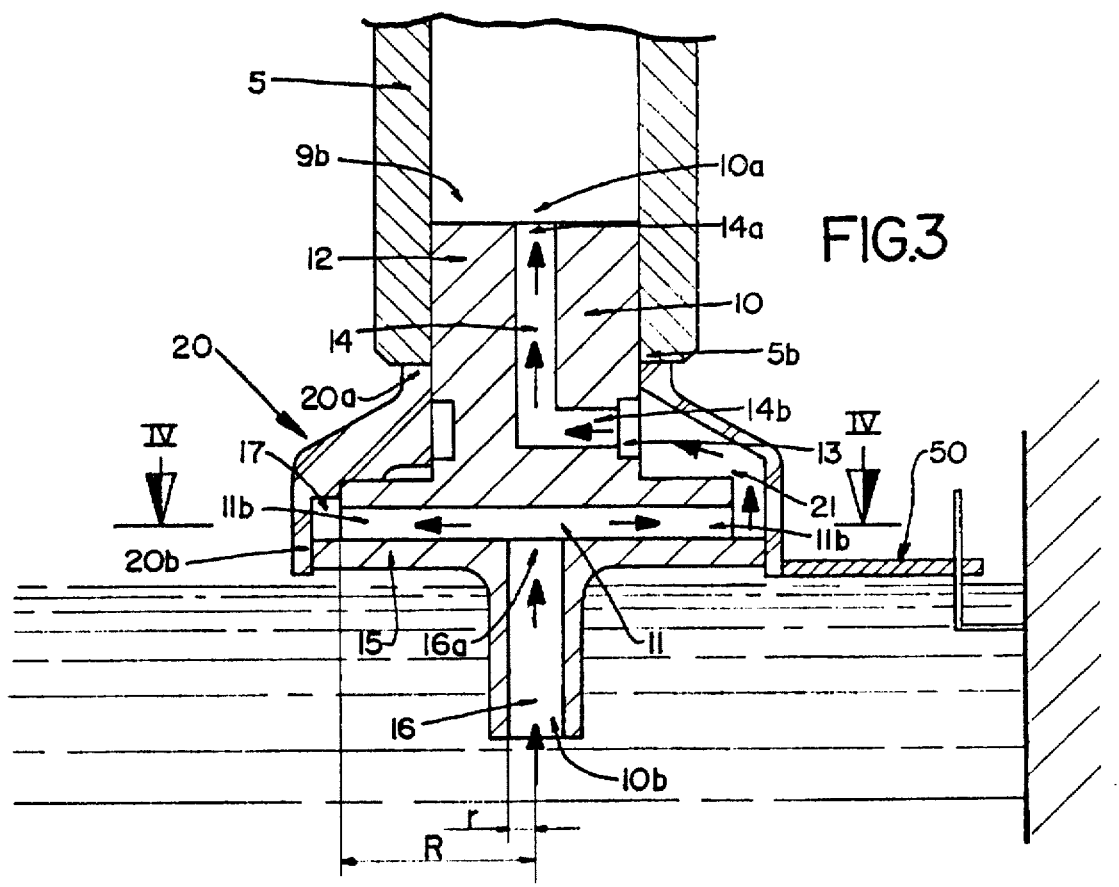
FIG. 3 illustrates in a longitudinal view the inside of a hermetic compressor with an oil pump of the present invention.
Figure 4:
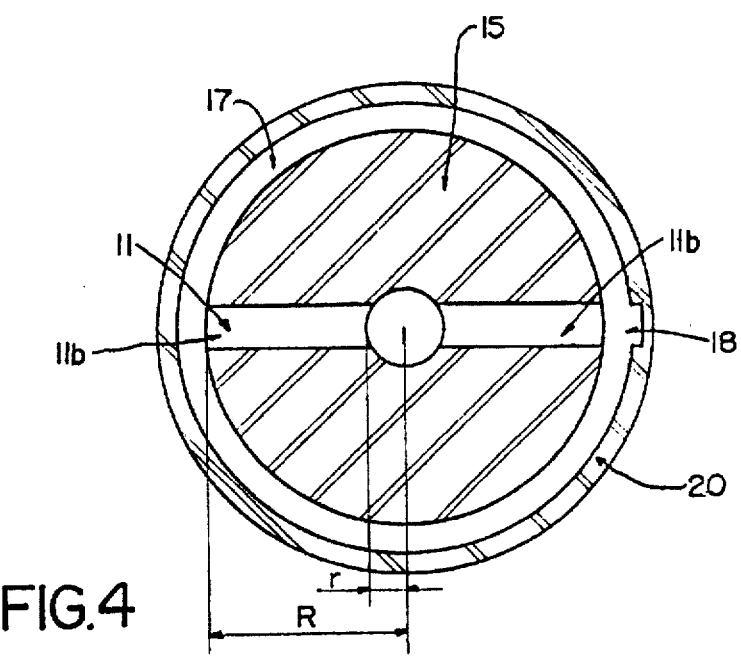
FIG. 4 is an enlarged cross sectional view of the oil pump of the present invention.

According to the present invention and as shown in FIG. 3, the increase of the pumping capacity for centrifugal oil pumps is achieved with an increase of the difference between said smaller radius r, relative to the opening of the lower end nozzle 10b for the entrance of oil into the pump rotor 10, and a larger radius R, of maximum spacing from the geometric axis of the oil pump. This larger radius R is defined by the extension of at least one radial channel 11, which is preferably orthogonal to the lower end nozzle of the oil inlet 10b and which communicates the oil received from the sump 2 by said lower end nozzle 10b with an oil receiving region as described below.

In another possible construction, said radial channel 11 is upwardly inclined from the lower end nozzle 10b of the pump rotor 10.

The pump rotor of the present invention has an attaching upper portion 12, in the form of a retaining cylindrical head, and a tubular sleeve 20. The attaching head 12 avoids the relative movement between the pump rotor 10 and the eccentric shaft-rotor assembly, due to the pressure exerted by the lateral walls of said head 12 against the internal wall of an axial housing defined at the lower end 5b of the eccentric shaft 5, or at the lower portion of an axial central bore of the rotor 8, when the eccentric shaft 5 does not reach the lower face of the rotor 8.

According to the present invention, said head 12 has adjacent to the lower portion thereof a round peripheral groove 13, which is concentric with the geometric axis of said pump rotor 10 and which defines an oil ring together with the adjacent internal wall of the tubular sleeve 20 and whereon the oil pumped from the sump 2 is continuously deposited in order to be sent to the oil channel 9.

The fluid communication between said peripheral groove 13 and the oil channel 9 is made through a dragging duct 14, with an "L" shape and provided inside the head 12, in such a way as to present a small radial extension thereof connected to a central axial extension for oil elevation. Said dragging duct 14 has an oil outlet upper end 14a, opened to the inside of the oil channel of the eccentric shaft 5, and an oil inlet lower end 14b, opened to the peripheral groove 13, which communicates with an oil duct, to be described below, and where the oil centrifugated from the sump 2 is deposited before being conducted to the oil channel 9, without power loss.

In another possible embodiment, the peripheral groove 13 is provided at an angular sector in the periphery of the head 12, where the lower end 14b of the dragging duct 14 is located. In either of the embodiments described above, said peripheral groove 13 may optionally surround the external wall of said head 12, till reaching said lower end 14b of the dragging duct 14, following an upward helical path that does not surpass the lower end of the shaft. In this case, for the purpose of oil dragging, said helical groove should be provided at the portion of the head 12 in contact with the internal walls of the tubular sleeve 20, occupying an angular extension of the peripheral wall of said head 12 and defined dimensionally in accordance with the desired oil amount to be supplied to the oil channel 9.

Though not illustrated, in another embodiment the dragging duct 14 may be in the form of at least an external longitudinal slot extending from the peripheral groove 13 up to the upper end 10a of the pump rotor 10. In an alternative of this solution, the head 12 is provided with a plurality of dragging ducts 14, longitudinally crossing the inside of said head and forming a diverging ascending bundle of ducts. In another alternative, the head 12 maintains a fluid communication between the peripheral groove 13 and the oil channel 9, through a combination of dragging ducts and peripheral slots.

The pump rotor 10 further includes a centrifugation lower portion, comprising a centrifugation base 15, which is preferably round and flat and which incorporates at its center, from the upper face thereof, the head 12 and, aligned with the latter, from the lower face of said round base 15, a pumping tubular duct 16, in the form of a tubular conductor that is constantly immersed in the oil sump 2 and through which the oil is led to the radial channel 11. Said tubular duct 16 presents an upper opening 16a, communicating the lower nozzle 10b of the pump rotor 10 with the radial channel 11. Said radial channel 11 has an external end 11b spaced from the lower edge of the round base 15, so as to define, together with the tubular sleeve 20, an oil distribution annular duct 17, where the centrifugated oil is continuously deposited in the sump 2.

The portion of the pump rotor 10, external to the eccentric shaft 5, is surrounded by the tubular sleeve 20, attached to a portion of the compressor, for example, to the shell thereof, so as not to rotate with said pump rotor 10. This attachment can be made such as described in PI 9201761 (WO 93/22557). In the illustrated embodiment, said attachment is made through an attaching arm 50, attached to an inertial portion of the compressor, such as the shell 1 thereof.

The tubular sleeve 20 has an upper opening 20a, facing the lower end 5b of the eccentric shaft 5 and having its diameter matching the diameter of the lower end 9b of the oil channel 9, which communicates with a lower opening 20b, of a diameter that is slightly larger than the diameter of the corresponding basic portion 15 of the pump rotor 10. Said lower opening 20b faces the sump 2, and it may have its end edge permanently spaced from the oil located in said sump 2. The tubular sleeve 20 is kept constantly spaced from the pump rotor 10, thereby creating a minimum radial gap from the latter, said gap being necessary to prevent said tubular sleeve 20 from rotating together with the eccentric shaft-rotor assembly and thus eliminating the oil dragging operation.

Though not illustrated, the upper end 20a of the tubular sleeve 20 may be introduced into the axial housing, such as in the patent document cited above, if a portion of the head 12, which is not attached to said axial housing, comprises peripheral grooves that develop helically at this region. The edge of the upper opening 20a of said sleeve 20 is positioned relative to the eccentric shaft 5, slightly spaced therefrom, thereby allowing the presence at the region therebetween of a fine lubricating oil film, that avoids the contact wear of said parts during the rotation of the eccentric shaft-rotor assembly.

In the present embodiment, the lower opening 20b of the tubular sleeve 20 is defined at an internal body portion of said sleeve 20 in the form of a peripheral skirt, whose walls are parallel to the walls of the lower end 5b of the eccentric shaft 5, defining an external wall of said oil distribution annular duct 17. From a portion of said annular duct 17, there is extended, preferably longitudinally relative to said peripheral skirt, a lubricant fluid ascending channel 18, communicating the centrifugated oil through the radial channel 11, with the oil inlet 14b of the dragging duct 14 of the head 12. This ascending channel is defined by a recessed portion of the internal wall of the tubular sleeve 20, having a width at least matching with the diameter of the channel 11, in order not to cause the saturation of the oil annular duct 16 and the consequent oil return to the sump 2, thereby reducing the pumping efficiency.

During the oil pumping operation, the pump rotor 10 carries by centrifugation the oil from the sump 2 to the channel 11, where, due to the increase of the radius R, said oil is directed to the oil duct 17 with a power increase which is maintained, without significant losses, till said oil mass reaches the upper end 10a of the pump rotor 10, then passing to the oil channel 9.

We claim:

1. Centrifugal oil pump for a hermetic compressor comprising:

a hermetic shell which defines a lubricant oil sump at its bottom;

a cylinder block in said shell which supports a vertical shaft mounted to a rotor of an electric motor, the shaft having at least one internal oil channel with a lower end at the lower end of the shaft and an upper end with an opening to the shaft exterior at a point between the upper and lower ends of the shaft; a an upper extension of a pump rotor having an upper part within said shaft lower end and a lower part extending below said shaft lower end and a tubular sleeve attached to a fixed portion of the compressor, said tubular sleeve surrounding at least said lower part of said upper extension external to the shaft;

said pump rotor having a centrifugation region radially extending beyond the edges of the lower end of said shaft and a nozzle at its lower end that is immersed in the oil sump and in fluid communication with at least an upper radial nozzle that communicates with at least an oil conducting axial channel between the peripheral surface of said portion of the pump rotor external to the shaft and a respective angular sector of the adjacent internal wall portion of said tubular sleeve, said oil conducting axial channel communicating with the lower end of said shaft oil channel through at least one dragging duct which is longitudinally provided through the upper extension of the pump rotor.

2. Oil pump, according to claim 1, wherein said oil conducting axial channel is defined by a recess in the corresponding adjacent internal wall portion of said tubular sleeve.

3. Oil pump, according to claim 2, wherein said oil conducting axial channel communicates with an oil distributing annular duct between the outside of said pump rotor and said tubular sleeve, said duct being in fluid communication with said upper radial nozzle.

4. Oil pump, according to claim 2, wherein said centrifugation region is defined by a flat round base having upper and lower peripheral edges and having at least one internal radial channel providing communication between the lower end nozzle and the upper radial nozzle.

5. Oil pump, according to claim 4, wherein said at least one radial channel is orthogonal to the shaft.

6. Oil pump, according to claim 1, wherein said oil conducting axial channel communicates with the shaft oil channel through at least one dragging duct in said upper part of said pump rotor upper extension.

7. Oil pump, according to claim 6, wherein the oil dragging duct has an axial central portion in said pump rotor with an upper end opened to the shaft oil channel and at least one radial lower end opened to the oil conducting axial channel.

8. Oil pump, according to claim 7, wherein the lower end of each said dragging duct is opened to a peripheral annular oil duct on said lower part of said upper extension of said pump rotor.

9. Oil pump according to claim 1, wherein the radius of the opening of the nozzle at said lower end of said centrifugation region is smaller than the radius of said centrifugation region.

* * * * *